United States Patent
Cai

(10) Patent No.: US 8,528,620 B2
(45) Date of Patent: Sep. 10, 2013

(54) SWING ARM STYLE TIRE CHANGER

(76) Inventor: Xilin Cai, Shanghai (CN)

( * ) Notice: Subject to any disclaimer, the term of this patent is extended or adjusted under 35 U.S.C. 154(b) by 485 days.

(21) Appl. No.: 12/734,828

(22) PCT Filed: Jan. 17, 2008

(86) PCT No.: PCT/CN2008/070125
§ 371 (c)(1),
(2), (4) Date: Nov. 23, 2010

(87) PCT Pub. No.: WO2009/079929
PCT Pub. Date: Jul. 2, 2009

(65) Prior Publication Data
US 2011/0079362 A1     Apr. 7, 2011

(30) Foreign Application Priority Data
Dec. 25, 2007 (CN) .................. 2007 2 0077204 U

(51) Int. Cl.
*B60C 25/135* (2006.01)
(52) U.S. Cl.
USPC ........................................ 157/1.24; 157/1.17

(58) Field of Classification Search
USPC .............................. 157/1.24, 1.17, 1.26, 1.28
See application file for complete search history.

(56) References Cited

U.S. PATENT DOCUMENTS

| | | | | |
|---|---|---|---|---|
| 6,056,034 | A * | 5/2000 | Matnick ...................... | 157/1.24 |
| 6,173,751 | B1 * | 1/2001 | Magnani ...................... | 157/1.24 |
| 6,182,736 | B1 * | 2/2001 | Cunningham et al. ........ | 157/1.24 |
| 7,343,955 | B2 * | 3/2008 | Cunningham ............... | 157/1.24 |
| 7,438,109 | B2 * | 10/2008 | Cunningham ............... | 157/1.24 |

* cited by examiner

*Primary Examiner* — Hadi Shakeri
(74) *Attorney, Agent, or Firm* — Novoclaims Patent Services, LLC; Mei Lin Wong

(57) ABSTRACT

A swing arm style tire changer includes a base (1), a workbench (2), an upright stem (12), a swing arm (10) and a dismounting head (14). The swing arm (10) is attached to the upright stem (12) and is capable of rotating horizontally. The swing arm style tire changer also includes a first helper arm (11) connected to the swing arm (10); under said first helper arm (11) and connected thereto is a tire-pressing wheel (15) that may be moved vertically upwards and downwards. The first helper arm (11) is attached to the swing arm (10) and is capable of rotating horizontally, and a pneumatic cylinder (8) is arranged on said first helper arm (11). The swing arm style tire changer also includes a second helper arm (7).

14 Claims, 2 Drawing Sheets

SWING ARM STYLE TIRE CHANGER

BACKGROUND OF THE PRESENT INVENTION

1. Field of Invention

The present invention relates to a device for mounting and dismounting a tire member to and from a rim body of a tire object, and more particularly to a swing arm style tire changer.

2. Description of Related Arts

The economic development has led to the development and advancement of transportation in which the high volume use of vehicles has resulted in the greatly increasing need for tire repairing. The step of changing tire which used to be performed manually by labor is now performed by employing machinery which greatly reduces the labor requirement and hence increases the efficiency.

The Chinese patent publication number CN2188045Y has disclosed a tire changer device which includes a base; a rotatable work-bench mounted on the base comprising a jaw unit for securing the position of the wheel body; an upright stem having a top end comprising a rotatable swing arm mounted thereon; a tire changer arm mounted on the swing arm capable of moving upwardly and downwardly relative to the work-bench; and a tire changer head mounted on a bottom end of the tire changer arm. When the tire member is rotated together with the work-bench through the rotation movement of the work-bench, the tire changer head can perform the step of mounting or dismounting the tire member. Since the structural construction makes use of a suspending arm, the rigidity is relative low. As a result, the swing arm and the upright stem are easily deformed and distorted in shape caused by the force during the mounting or dismounting action, causing the tire changer head directly in contact or hitting the wheel body, thereby not only increasing a rotary resistance of the tire member, but also damaging the wheel body and the rim of the wheel body during rotation.

SUMMARY OF THE PRESENT INVENTION

The invention is advantageous in that it provides a swing arm style tire changer comprising a tire changer head which is not easily be deformed or distorted in shape, hence preventing damages to a rim body of a tire object causing by the tire changer head.

Additional advantages and features of the invention will become apparent from the description which follows, and may be realized by means of the instrumentalities and combinations particular point out in the appended claims.

According to the present invention, the foregoing and other objects and advantages are attained by a swing arm style tire changer which comprises a base, a workbench supported by the base, an upright stem extended from the base, a swing arm mounted on the upright stem and capable of rotating horizontally, and a dismounting head. The swing arm style tire changer further comprises a first auxiliary arm unit connected to the swing arm which comprises a tire-pressing wheel at a bottom end of the first auxiliary arm unit, wherein the tire-pressing wheel is pointing downward and is capable of moving vertically.

The present invention includes the first auxiliary arm mounted on the swing arm comprising the tire-pressing wheel at its bottom. When dismounting a tire member, the tire-pressing wheel is pressing on the tire member or the wheel member and receiving an upward force, while the tire changer head at the bottom of the swing arm is receiving the downward force from the tire member, the upward and the downward forces exerted on the swing arm and the upright stem are effectively offset by each other. Therefore, the swing arm and the upright stem are protected against deformation or distortion in shape. As a result, a reasonable distance between the tire changer head the rim body is maintained, the rotary resistance during the dismounting process is reduced, and the tire changer head is prevented from directly and physically in contact with the rim body, hence protecting the rim body from damages.

Preferably, the first auxiliary arm mounted on the swing arm in such a manner that the first auxiliary arm unit is capable of rotating horizontally.

Preferably, the first auxiliary arm unit comprises a first cylinder and a first piston rod operatively extended downward from the first cylinder, wherein the tire-pressing wheel is connected to a bottom end of the first piston rod. Therefore, the tire-pressing wheel is capable of moving pneumatically upward and downward through the first cylinder of the first auxiliary arm unit.

The present invention is further enhanced through the provision of a second auxiliary arm unit connected to the upright stem in such a manner that the second auxiliary arm unit is capable of rotating horizontally, that the second auxiliary arm unit comprises a tire-pressing head at a bottom end of the second auxiliary arm unit pointing downward and the tire-pressing head is capable of moving vertically and assisting the operation for dismounting or mounting a tire member.

Preferably, the second auxiliary arm unit comprises a second cylinder and a second piston rod operatively extended downward from the second cylinder, wherein the tire-pressing head is connected to a bottom end of the second piston rod. Therefore, the tire-pressing head is capable of moving pneumatically upward and downward through the second cylinder of the second auxiliary arm unit.

The tire-pressing head also has a tire-pressing member and a tire-supporting member, further assisting the operation for dismounting or mounting a tire member, such that the tire-pressing head which is equipped with both of the tire-pressing member and the tire-supporting member for performing different functions, has greatly increase the overall effectiveness and efficiency of the tire changer with a simplified construction.

Furthermore, the present invention further comprises an adapter unit detachably and securely connected to the bottom end of tire-pressing head in such a manner that a tapering end of the adapter unit is pointing vertically downward. When dismounting a tire member, the tapering end can be used to bias against the central through hole of the rim body so as to further stabilize the positioning of the rim body on the workbench.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

The present invention is further illustrated in the following figures and described in the detailed description.

DETAILED DESCRIPTION OF THE PREFERRED EMBODIMENT

Figure 1:
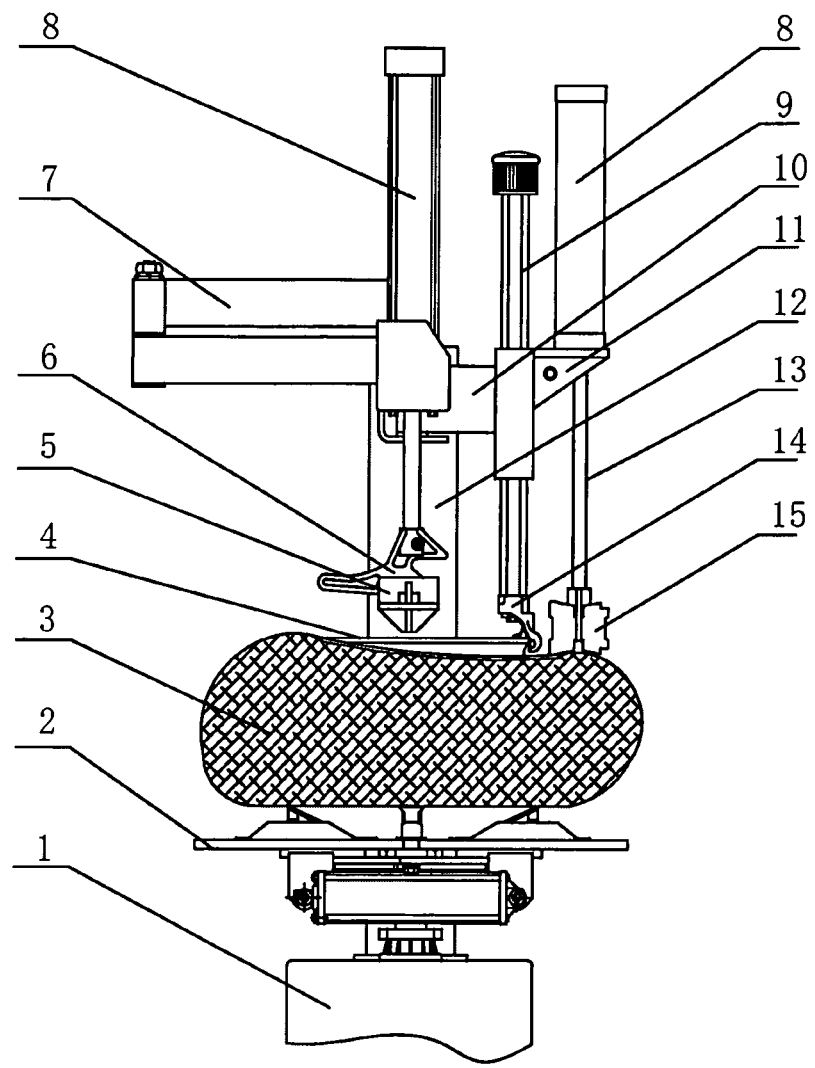
FIG. 1 is an illustration of a tire changer according to a preferred embodiment of the present invention.

Referring to FIG. 1 of the drawings, a swing arm style tire changer of a preferred embodiment of the present invention comprises a base 1, a swing arm 10 and a tire changer arm 9. The base 1 having a base body comprises a work-bench 2 supported by the base body and an upright stem 12 mounted onto the base body, wherein the work-bench 2 is connected to a transmission system of the base body and operatively connected with the base body in such a manner that the work-bench 2 is capable of rotating along a vertical axis defined by the base body. In other words, the work bench 2 is rotatably mounted on the base body, adapted for rotating relative to the base body horizontally while being supported by the base body. The work-bench 2 comprises a positioning unit adapted for positioning a rim body 4 of a tire object, such that when the rim body 4 of the tire object is securely positioned on the work-bench 2 through the positioning unit, the rim body 4 will be guided to rotate along with the work-bench 2 coaxially and simultaneously. The swing arm 10 is mounted on an upper portion of the upright stem 12 which is above the level of the work-bench 2 in such a manner that the swing arm 10 is capable of rotating at a horizontal level around the upright stem 12 and above the work-bench 2. The swing arm 10 has an end portion connecting to the tire changer arm 9 in such a manner that the tire changer arm 9 is capable of moving vertically such that a distance between the tire changer arm 9 and the work-bench 2 is adjustable and controllable. The tire changer arm 9 comprises a tire changer head 14 at an end portion of the tire changer arm 9, wherein the tire changer head 14 further comprises a dismounting unit and a mounting unit, adapted for dismounting and mounting a tire member 3 from and onto a rim body 4 respectively. In other words, the tire changer head 14 is a dismounting head when used for dismounting a tire member 3 from the rim body 4 and is a mounting head when used for mounting the tire member 3 onto the rim body 4 of the tire object.

Figure 2:
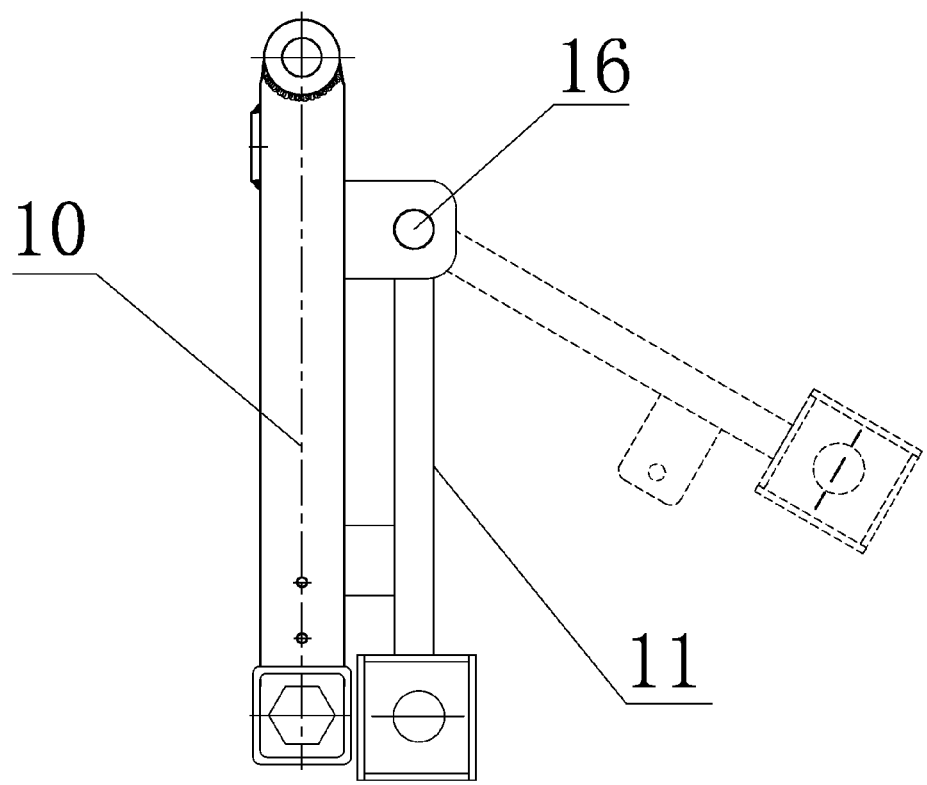
FIG. 2 is a top view illustration of the relationship between a swing arm and a first auxiliary arm unit of the tire changer according to the above preferred embodiment of the present invention.

Referring to FIG. 2 of the drawings, a first auxiliary arm unit 11 of the swing arm style tire changer of the present invention, which is a first help arm, comprises a first connecting arm unit 16 mounting the first auxiliary arm unit 11 onto the swing arm 10 at one end such that the first auxiliary arm unit 11 is pivotally and rotatably supported through the connecting arm unit 16 and is capable of rotating along an axis which is defined by the first connecting arm unit 16. Alternatively, the first auxiliary arm unit 11 may further provide a first lock unit adjustably locking a position of the first auxiliary arm unit 11 relative to a position of the swing arm 10. It is worth mentioning that, as shown in FIG. 2, while the first auxiliary arm unit 11 is connected to the swing arm 10 through the first connecting arm unit 16 which is a pivot pin unit, other alternative connection for connecting the first auxiliary arm unit 11 and the swing arm 10 can also be used in the swing arm tire changer as long as the force transfer between the first auxiliary arm unit 11 and the swing arm 10 is achieved.

The first auxiliary arm unit 11 comprises a tire-pressing wheel 15 and a first piston arrangement driving the tire-pressing wheel 15 in a vertical movement. In particular, the first piston arrangement comprises a first cylinder 8 comprising a first piston rod 13 extended downward, that the tire-pressing wheel 15 is connected to a bottom end of piston rod 13 of the cylinder 8 and is guided to move controllably through the piston rod 13 of the cylinder. For example, the piston arrangement is a pneumatic cylinder providing the piston rod 13 for rapidly lifting up or dropping down the tire-pressing wheel 15 in a vertical direction.

The swing arm style tire changer of the present invention further comprises a second auxiliary arm unit 7, which is a second helper arm, horizontally connected to an upper portion of the upright stem 12 such that the second auxiliary arm unit 7 is operative above the work-bench 2 and is capable of rotating horizontally around the upright stem 12. The second auxiliary arm unit 7 comprises a second arm body, a tire-pressing head 6 and a second piston arrangement supported through the second arm body and adapted for driving and guiding a vertical movement of the tire-pressing head 6. In particular, the second piston arrangement comprises a second cylinder 8 comprising a second piston rod 13 extended downward, that the tire-pressing head 6 is connected to a bottom end of piston rod 13 of the cylinder 8 and is guided to move controllably through the piston rod 13 of the cylinder. For example, the second piston arrangement is a pneumatic cylinder providing the piston rod for driving a vertical movement of the tire-pressing head 6. The second auxiliary arm unit 7 further comprises two arm members pivotally connected together end-to-end to form the second arm body through which the tire-pressing head 6 can be guided to move at a horizontal level. Preferably, the two arm members, each having a connecting end, are pivotally and rotatably mounted at the connecting ends, that the first arm member is mounted onto the swing arm 10 at an opposite end to the connecting end for gaining pivotal support and is transversely extended from the swing arm 10, that the second arm member having the connecting end connected to the first arm member is connected to the second piston arrangement at an opposite end to the connecting end, that the two arm members are adapted for providing and guiding the horizontal movement of the tire-pressing head 6 through the piston rod of the cylinder of the second piston arrangement, which is coaxially connected with the tire-pressing head 6. In other words, the second piston arrangement is a pneumatic cylinder providing the piston rod 13 for driving a vertical movement of the tire-pressing head 6 and the first and second arm members are arranged for providing a horizontal movement of the tire-pressing head 6.

Figure 3:
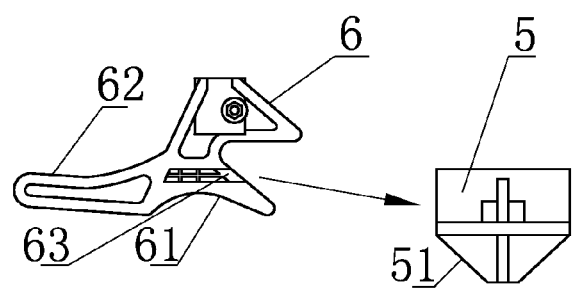
FIG. 3 is an illustration for the partially enlarged view of a tire-pressing head of the tire changer according to the above preferred embodiment of the present invention.

Referring to FIG. 3 of the drawings, an adapter unit 5 may further be provided and connected to the tire-pressing head 6 for providing a force at a predetermined position of the rim body 4 of the tire object. The tire-pressing head 6 has a tire-pressing member 61, a tire-supporting member 62 and an engaging slot 63, wherein the adapter unit 5 is connected to the tire-pressing head 6 through the engaging slot 63 in such a manner that the adapter unit 5 is detachably and securely connected to the tire-pressing head 6. The adapter unit 5 further provides a tapered end portion 51 pointing downward, adapted for applying a force which is vertically downward to an edge portion of the hole of the rim body 4.

The present invention further provides a method of use as follows.

The method of dismounting a tire member 3 from a rim body 4 of the tire object comprises the following steps. The tire object is placed on a work-bench 2 and is securely retained on the work-bench 2 through the positioning unit thereof. A portion of the tire member 3 is then disengaged from the rim body 4 at a position near to the tire changer head 14 by moving the tire-pressing wheel 15 to bias against the tire member 3. Accordingly, the tire changer head 14 is positioned at a distance of 2-3 mm away from the rim body 4 such that the tire changer head 14 is not directly and physically in contact with the rim body 4. Then, the tire changer arm 9 is preferably locked by the pneumatic locking device to prevent vertical movement of the tire changer arm 9. A first inner edge of the tire member 3 of the tire object is positioned at the dismounting unit of the tire changer head 14, preferably by using a pry, then, the tire-pressing wheel 15 is switched into a position at an edge portion of the rim body 4 corresponding to the position of the tire changer head 14. The adapter unit 5 is assembled at a tire-pressing head 6 and is positioned to bias against the central through hole of the rim body 4 by moving the tire-pressing head 6. Lastly, the corresponding first inner edge of the tire member 3 can be dismounted from the rim body 4 of the tire object completely by rotating the work-bench 2 for one complete turn, which is defined as one cycle. In the above steps, since the tire-pressing wheel 15 is biased against the rim body 4 and is receiving an upward force while the tire changer head 14 is biased against the tire member 3 and is receiving a downward force, the upward and the downward forces exerted on the swing arm 10 and the upright stem 12 are effectively offset by each other. Therefore, the swing arm 10 and the upright stem 12 are protected against deformation or distortion in shape. As a result, a reasonable distance between the tire changer head 14 and the rim body 4 is maintained, the rotary resistance during the dismounting process is reduced, and the tire changer head 14 is prevented from directly and physically in contact with the rim body 4, hence protecting the rim body 4 from damages.

After completely dismounting the tire member 3 from the rim body 4, the method further provides the following steps. The tire-pressing head 6 is repositioned such that the tire-supporting member 62 of the tire-pressing head 6 is arranged to support the tire member 3 at the opposed side (i.e. the bottom side) of the tire object in such a manner that a second inner edge of the tire member 3 is in contact with an edge of the rim body 4 at the first side. Then, the tire member 3 is dismounted from the rim body 4 by using the tire changer head 14. Therefore, the tire member 3 is completely dismounted from the rim body 4 of the tire object.

The present invention further provides a method of mounting the tire member 3 onto the rim body 4 of the tire object, comprising the following steps. The rim body 4 is firstly placed on the work-bench 2 and is securely retained through the positioning unit. The edge of the tire member 3 is positioned on the mounting unit of the tire changer head 14, wherein the tire-pressing wheel 15 is moved to bias against the tire member 3 at a position near to the tire changer head 14 until the tire member 3 is at a position which is 5-6 mm below the mounting unit of the tire changer head 14. Then, the adapter unit 5 is disassembled from the tire-pressing head 6 and the tire-pressing head 6 is moved to a position such that a horizontal distance is maintained between the tire-pressing head 6 and the tire changer head 14 while the tire-pressing member 61 is biased against the tire member 3 until the tire member 3 is positioned at a position corresponding to the rim body 4 which has the minimum diameter. Lastly, the work-bench 2 is rotated for one turn such that the tire member 3 is mounted onto the rim body 4 completely. In the above steps, since the tire-pressing wheel 15 is biased against the tire member 3 and is receiving an upward force while the tire changer head 14 is receiving a downward force from the tire member 3. In other words, the upward and the downward forces exerted on the swing arm 10 and the upright stem 12 are effectively offset by each other. Therefore, the swing arm 10 and the upright stem 12 are protected against deformation or distortion in shape. As a result, a reasonable distance between the tire changer head 14 and the rim body 4 is maintained and the tire changer head 14 is prevented from directly and physically in contact with the rim body 4, hence protecting the rim body 4 from damages.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A swing arm style tire changer for mounting and dismounting a tire member to and from a rim body, comprising:
   a base;
   workbench rotatably supported by said base;
   an upright stem upwardly extended from said base;
   a swing arm having a first end portion mounted on said upright stem for rotating about said upright stem;
   a tire changer arm movably mounted on a second end portion of said swing arm, wherein said tire changer arm is adapted to controllably move along a vertical direction so that a distance between said tire changer arm and said work bench is adjustable;
   a tire changer head provided on said tire changer arm and maintaining a predetermined distance from said rim body;
   a first auxiliary arm unit connected to said swing arm and comprising a tire-pressing wheel formed at a bottom end of said first auxiliary arm unit, wherein said tire-pressing wheel orients pointing downwardly and is adapted to move along a vertical direction and switch to selectively bias against said tire member and said rim body;
   a second auxiliary arm unit connected to said upright stem and adapted to rotate about said upright stem; and
   a tire-pressing head mounted to said second auxiliary arm unit, wherein said tire pressing head orients downwardly and is adapted to move in along a vertical direction and to bias against a central through hole of said rim body.

2. The swing arm style tire changer as recited in claim 1, wherein said first auxiliary arm unit is rotatably mounted on said swing arm in such a manner that said first auxiliary arm unit is capable of rotating horizontally.

3. The swing arm style tire changer as recited in claim 1, wherein said first auxiliary area unit comprises a first cylinder and a first piston rod operatively and downwardly extending from said first cylinder, wherein said tire-pressing wheel is connected to a bottom end of said first piston rod.

4. The swing arm style tire changer as recited in claim 1, wherein said second auxiliary arm unit comprises a second cylinder and a second piston rod operatively and downwardly extending from said second cylinder, wherein said tire-pressing head is connected to a bottom end of said second piston rod.

5. The swing arm style tire changer as recited in claim 4, wherein said tire-pressing head has a tire-pressing member and a tire-supporting member.

6. The swing arm style tire changer as recited in claim 5, further comprising an adapter unit detachably and securely connected to said tire-pressing head in such a manner that a tapering end of said adapter unit orients downwardly.

7. A swing arm style tire changer for a tire object having a tire member and a rim body, comprising:

a base;
a workbench rotatably supported by said base;
an upright stem upwardly extending from said base;
a swing arm rotatably connecting to and transversely extending from said upright stem, wherein said swing arm is adapted to rotate about a longitudinal axis of said upright stem;
a tire changer arm movably mounting on said swing arm and at a distance from said upright stem, wherein said tire changer arm is adapted to controllably move along a vertical direction so that a distance between said tire changer arm and said work bench is adjustable, wherein said tire changer arm comprises a tire changer head forming at a bottom end portion of said tire changer arm and maintaining a predetermined distance from said rim body;
a first auxiliary arm unit connected to said swing arm and comprising a tire-pressing wheel forming at a bottom end of said first auxiliary arm unit, wherein said tire-pressing wheel orients downwardly and is adapted to move along a vertical direction and switch to selectively bias against said tire object; and
a second auxiliary arm unit horizontally extending from an upper portion of said upright stem and comprising a tire-pressing head, wherein said second auxiliary arm unit is adapted to rotate about a longitudinal axis of said upright stem,
wherein said first auxiliary arm unit is configured to balance a torque exerted on said swing arm when said tire member is mounted on and dismounted from said rim body of said tire object.

8. The swing arm style tire changer as recited in claim 7, said first auxiliary arm unit comprises a first connecting arm unit mounting said first auxiliary arm unit onto said swing arm at one end thereof such that said first auxiliary arm unit is pivotally and rotatably supported through said connecting arm unit.

9. The swing arm style tire changer as recited in claim 7, wherein said first auxiliary, arm unit further comprises a first piston arrangement comprising a first cylinder having a first piston rod extending downwardly along a longitudinal direction of said first cylinder, wherein said tire-pressing wheel is connected to a bottom end of said piston rod and is guided to move in a vertical direction.

10. The swing arm style tire changer as recited in claim 9, further comprising an adapter unit connecting to said tire-pressing head, wherein said adapter unit has a tapered end portion adapted for applying a force towards an edge portion of a hole of said rim body.

11. The swing arm style tire changer as recited in claim 10, wherein said tire-pressing head comprises a tire-pressing member, a tire-supporting member and an engaging slot, wherein said adapter unit is connected to said tire-pressing head through said engaging slot.

12. The swing arm style tire changer as recited in claim 7, said second auxiliary arm unit comprising a second piston arrangement which comprises a second cylinder having a second piston rod mounting on said second auxiliary arm unit, wherein said tire-pressing head is connected to a bottom end of said piston rod of said second cylinder and is guided to move in a vertical direction.

13. The swing arm style tire changer as recited in claim 7, further comprising an adapter unit connecting to said tire-pressing head, wherein said adapter unit has a tapered end portion adapted for applying a force towards an edge portion of a hole of said rim body.

14. The swing arm style tire changer as recited in claim 13, wherein said tire-pressing head comprises a tire-pressing member, a tire-supporting member and an engaging slot, wherein said adapter unit is connected to said tire-pressing head through said engaging slot.

* * * * *